Jan. 31, 1939.  K. SCHRÖTER ET AL  2,145,406
AUTOMATIC BRAKE FOR TRAILER VEHICLES
Filed Dec. 30, 1936  2 Sheets-Sheet 1
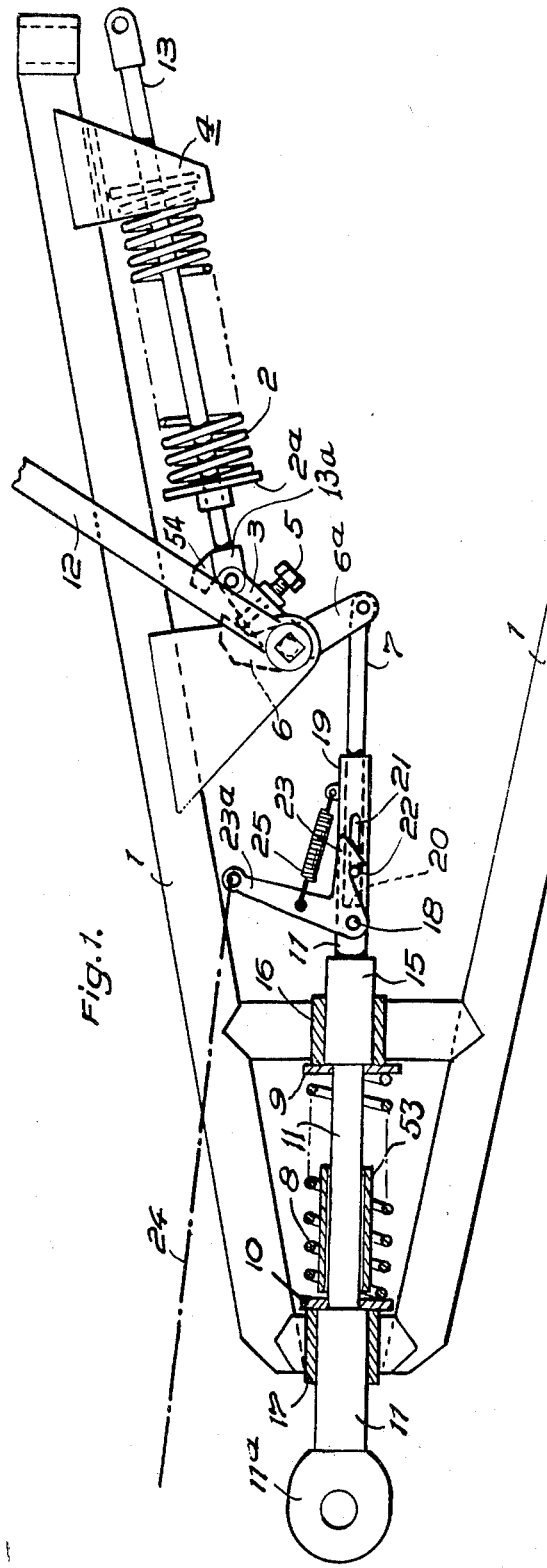
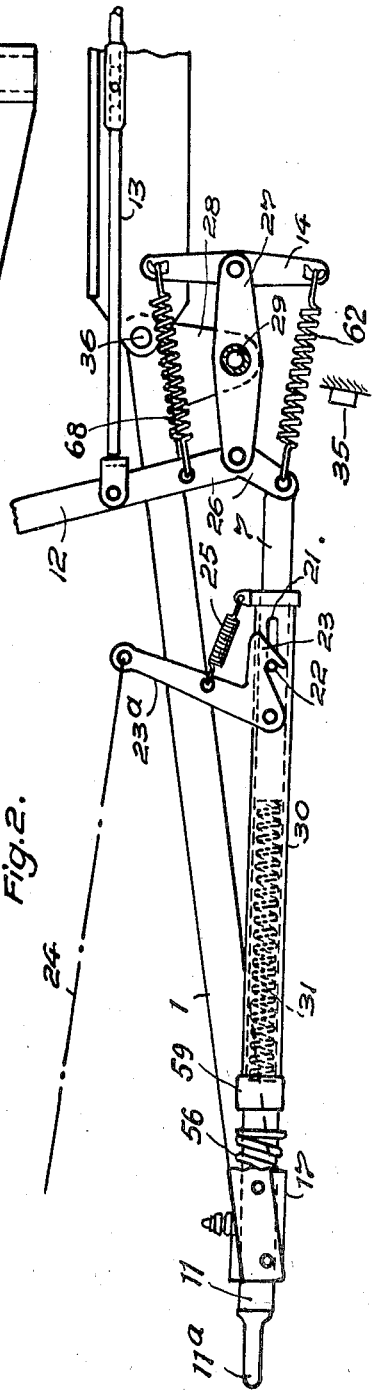
Inventors:
Kurt Schröter and
Hans Schröter
by Knight Bros
attorneys Jan. 31, 1939.   K. SCHRÖTER ET AL   2,145,406
AUTOMATIC BRAKE FOR TRAILER VEHICLES
Filed Dec. 30, 1936   2 Sheets-Sheet 2
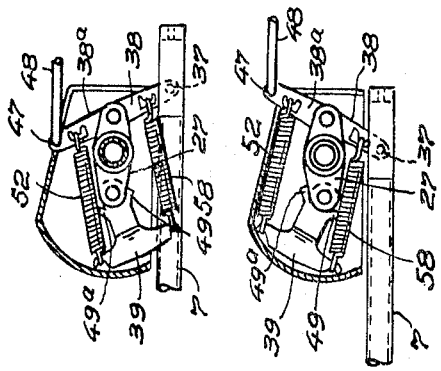
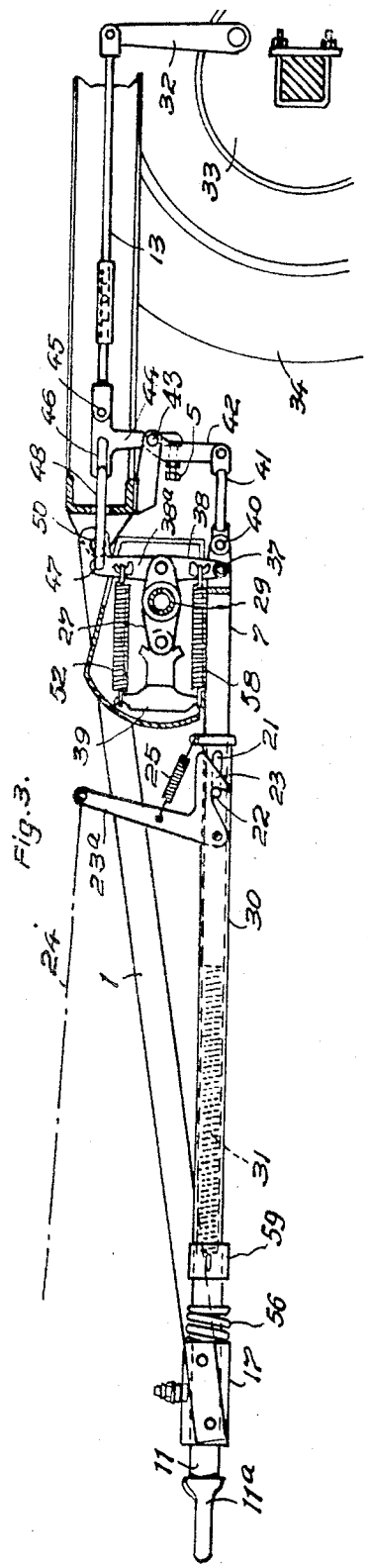
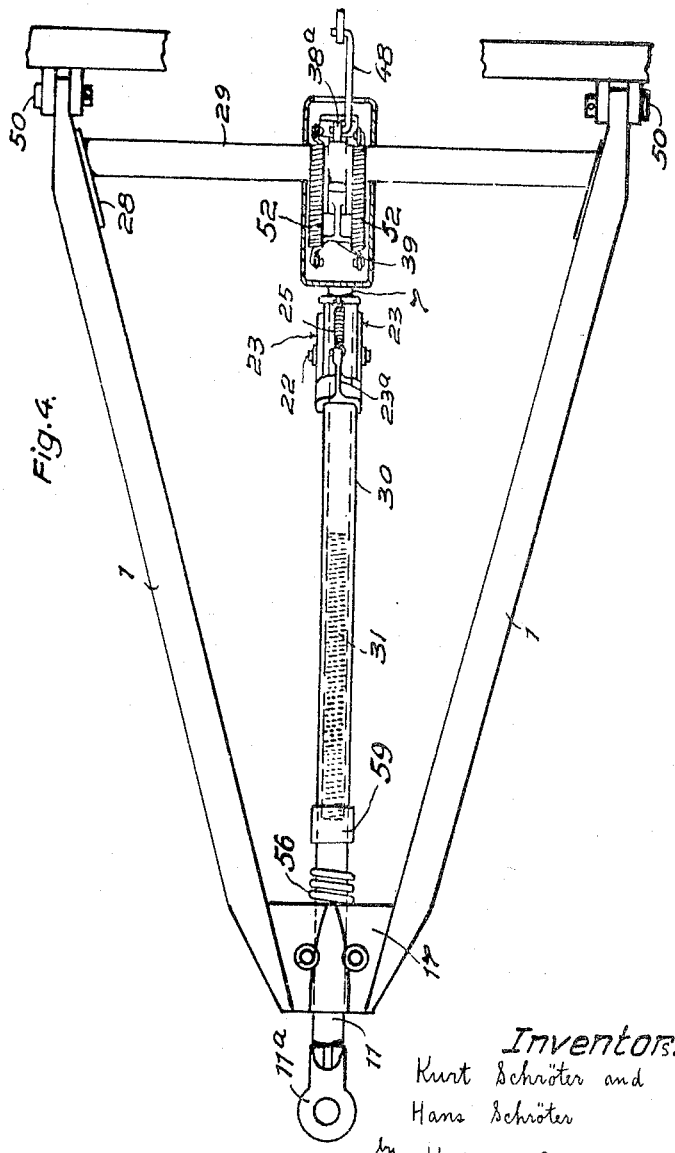
Inventors:
Kurt Schröter and
Hans Schröter
by Knight Bros
Attorneys Patented Jan. 31, 1939

2,145,406

UNITED STATES PATENT OFFICE 2,145,406

AUTOMATIC BRAKE FOR TRAILER VEHICLES

Kurt Schröter and Hans Schröter, Wechmar, Germany

Application December 30, 1936, Serial No. 118,198
In Germany August 14, 1936

17 Claims. (Cl. 188—112)

This invention relates to automatic brakes for trailer vehicles.

In known brakes for trailer vehicles the brakes are automatically applied upon relative motion between the tractor and trailer by a power accumulator, such as springs, and a second power accumulator of greater initial tension serves for releasing the brake power accumulator.

The invention relates to a further development and improvement of this type of brake, and the advantage afforded by it substantially consists in reducing the moment of the releasing force of one power accumulator relative to that of the other, the brake applying accumulator, to such an extent that, during the braking process, the moment of force of the brake power accumulator preponderates and the latter causes an auxiliary power to be freed which operates the trailer brake over and above the pressure due to overtaking and independently of it. Furthermore, means are provided which at a very slight expenditure of force permit the release of a brake power accumulator interposed in the brake rigging and thereby starting of the brakes independently of the pressure due to overtaking. In these brakes, the load pull is extended during the braking process, since the auxiliary power released for the trailer brake brakes the trailer independently of running-up pressure.

The invention affords the further advantage that the braking effect can be automatically adapted, up to a certain magnitude of running-up pressure, to the various requirements during driving by lighter or heavier braking.

Another advantage of the invention is that during normal operation the pull exerted by the tractor on the trailer automatically loads or charges again the power accumulator previously released for braking and what is particularly important, without it being necessary to operate a locking pawl, etc., or to back up the tractor.

Still another advantage of the invention is that by pulling a control line from the tractor the auxiliary power of the brake power accumulator can be more or less released according to requirements.

According to the invention, both power accumulators, i. e., the damping or release power accumulator and the brake applyling power accumulator, arranged on the trailer are coupled with one another by levers in such manner that the moments of the forces which they oppositely exert vary progressively with the change of position of the members controlling them and in such manner that an auxiliary force is freed now in the one direction and again in the other direction, and that manually controllable means are provided which, independently of the running-up pressure of the trailer, release a brake power accumualtor and apply the brakes. This accumulator may be the one cooperating with the release power accumulator or a special brake power accumulator built into the brake rigging, release being effected in both instances by means of a pawl.

The above described effect of the automatic variation of the moments of the forces which the brake power and the release power accumulators oppositely exert on one another can be preferably attained according to the invention by connecting both power accumulators through connecting members to a lever having arms which are so short relatively to the possible total expansion stroke of the power accumulators that the effective leverages at which the power accumulators act on the lever progressively and considerably vary, whereby the effective moments of the forces are varied also.

To insure uniform initial loading of both power accumulators, they can act on a common scale beam which brings it about that their tensions and consequently also their initial tensions remain the same at a variation of their effective lever arms on the connecting lever.

Furthermore, the invention provides simple means by means of which the power accumulating device and the special additional brake power accumulator, for the manual release of the brake, can be loaded again or brought into release position in a very simple manner and without special expenditure of force.

The invention further makes provision for automatic action of the brake, when the trailer is uncoupled, in such manner that the depression of the towing pole of the trailer causes application of the brake to a greater or lesser extent and full braking of the trailer is effected by the weight of the pole. In case of a detached trailer the brakes are therefore always put on.

According to a further feature of the invention, the braking device is so constructed that it will act equally well at any level of the coupling of the tractor.

By way of example, one form of the invention is illustrated in the accompanying drawings, in which Figure 1 is a top view of a braking device built into the towing pole of a trailer; Fig. 2, a side view, partly in section, of another form of brake in connection with a scale beam; Fig. 3, a side view, partly in section, of still another form of brake;

Fig. 4, a top view of the brake shown in Fig. 3; Fig. 5, a partial view of Fig. 3 with the brake power and release power accumulator springs and the levers connected therewith in braking position; and Fig. 6, a view of the parts shown in Fig. 5, but in the position when the brake is released.

Referring to the drawings, and first to Fig. 1, the brake power accumulator 2, formed for instance of one or more springs, is connected to the lever 3 by means of the spring plate 2a on the left and supported at the right hand end against a bracket 4 on the towing pole 1. By means of the set screw 5 the lever 3 bears against a two-armed lever 6, 6a which is acted upon, through the connecting rod 7 and the joint 18, by the release power accumulator 8 which also comprises for instance one or more springs and is arranged between the two spring plates 9, 10 on the coupling rod 11 longitudinally displaceable in the bearings 16, 17 and provided with the traction eye 11a. The spring plate 9 on the right abuts against a sleeve 15 fixed on the coupling rod 11 and the spring plate 10 on the left against a shoulder formed by the reduction of the coupling rod 11. Both spring plates 9, 10 are loosely guided on the coupling rod 11 and, moreover, in the position shown abut against the bearings 16, 17. The release power accumulator 8 acts, therefore, from the position of rest illustrated, against the motion of the coupling rod 11 in both directions. To prevent undue displacement of the coupling rod 11 in case of excessive jolting during starting or overtaking, suitable stops, etc., not shown, may be provided on it to limit its movement in both directions. Furthermore, under the power accumulator spring 8 a sheath 53 may be provided on the coupling rod 11 to prevent lateral yielding of the spring during compression.

With the lever 3 a hand lever 12 is firmly connected and may be operated by a draw cord, etc. from the driving seat of the tractor. The tension or pressure rod 13 transmits the power of the brake power accumulator 2 or the auxiliary brake power existing at the time being to the brakes of the trailer.

The connecting rod 7 is displaceably disposed in the sheath 19 articulated to the coupling rod 11 and, in the position shown, abuts against a stop 20 inside the sheath 19. Through the longitudinal slot 21 of the sheath 19 extends a pin 22 secured to the rod 7, and behind the pin 22 engages a double-armed locking lever 23, 23a rotatably arranged at 18. 24 is a tripping line leading to the tractor and operable for instance from the driving seat thereof. Therefore, as long as the rod 7 is not released by a pull of the line 24 and raising of the hook 23 it is firmly connected with the joint 18 or the coupling rod 11. With the exception of the cases described below the hook 23 always remains in the position shown.

The action of the arrangement according to Fig. 1 is as follows: In the position illustrated, the brakes are released. No external force is acting upon the drawrod 11. The brake releasing spring 8 presses the spring plate 9 against the stationary guide bearing 16 and, through the spring plate 10, presses the drawbar 11 to the left until the spring plate 10 rests against the stationary guide bearing 17. The drawbar 11 exerts a pull upon the connecting rod 7 and, through the bell crank lever 6, 6a, the adjustable abutment 5, and the lever 3 fixed to the hand lever 12, compresses the braking spring 2 sufficiently so that by the resulting displacement of the brake rod 13 toward the right, the brake is released. However, the braking spring 2 is not completely compressed at this time, in order to provide for an additional slight compression under conditions to be described presently.

If the trailer runs up towards the tractor and in consequence thereof the coupling rod 11 and the connecting rod 7 are displaced to the right while simultaneously the power storage member 8 is compressed, the effective lever arm of the lever member 6a decreases owing to the decreasing vertical distance of the connecting rod 7 pressing upon the lever member 6a from the fulcrum of the lever 6, 6a. The latter swings in anticlockwise direction, and the lever 3 follows it under the action of the power accumulator 2. At the same time, however, by reason of the increasing perpendicular distance between the axis of the spring and the pivotal point of the lever 3, the moment of the brake power accumulator 2 increases until finally a position is reached at which the moment of the brake power accumulator 2 surpasses the moment which is produced by the force of the release power accumulator 8 reduced by the running-up pressure, and is directed oppositely to the moment of the brake power accumulator 2. The brake power accumulator 2 with the auxiliary power freed in it compresses therefore the release power accumulator 8 still further by way of the connecting members 3, 5, 6, 7 in the direction of the running-up pressure and thereby applies the brakes by the pull on the rod 13. Shortly before the brakes are completely put on and the levers 3 and 6 have reached their end position, the lever arm of the lever member 6a articulated to the rod 7 has become so small in relation to the lever arm of the lever 3 that the moment of the brake power accumulator 2 also remains greater than the moment of the release power accumulator 8 on stoppage of the running-up pressure so that the brakes remain applied. The running-up pressure can be as great as desired without damage, since owing to the interruption between the levers 3 and 6 the braking power can never be greater than corresponds to the tension of the brake power accumulator 2.

This braking position is maintained until a pull is exerted on the coupling rod 11 and with increased movement of the lever 6, 6a in clockwise direction the effective leverage of the lever member 6a increases and brake pressure is diminished. Simultaneously with further movement of the lever 3 in clockwise direction, the moment of the force of the brake power accumulator 2, which is oppositely directed to the direction of pull of the coupling rod 11, is reduced on account of the reduction of the leverage of the accumulator 2. The brakes, therefore, with increasing pull are always easier to release since the resistance of the brake power accumulator 2 thereby approximates the zero value, whilst the moment of the release power accumulator 8 increases up to a maximum. After a certain swinging of the lever 6, 6a the moment of the force exerted by the brake power accumulator 2 consequently becomes less than that of the release power accumulator 8, so that in the latter an auxiliary force is released which automatically, without pull on the rod 11, holds the brakes released and can be used also for damping of jolting due to running up.

The separation of the lever 6, 6a from the lever 3, which in a simple construction could be connected with one another, has the advantage that the braking force exerted on the rod 13 can never become greater than that which corresponds to the tension of the brake power accumulator 2, since in case of excessive jolting due to running up the lever 6, 6a can move independently of the lever 3. Moreover, by means of the adjustable stop 5 the sensitiveness of the arrangement can be varied at will. This separation of the lever 6, 6a from the lever 3 permits, furthermore, the backing up of the trailer by the tractor, it being only necessary to render the brake power accumulator inoperative by moving the lever 12 to the right until the lever 3 and the rod 13 form an obtuse angle open on top and the lever abuts against a stop 54, which is fixed to the connecting member 13a. During the swinging of the lever 12 toward the right the braking spring 2 is first compressed somewhat further, until the lever 3 comes into the same plane with the connecting rod 13. Then the spring expands again and presses the lever 3 against the abutment 54. In this position the lever 3 remains until it is again thrust back to operative position by a pull to the left on hand lever 12 which throws the set screw 5 against the lever arm 6.

The spring 8 also serves for damping the jolts caused by starting and overtaking. When the trailer runs up towards the tractor, the difference between the initial loading or power of the power accumulator 8 and the moment of the other power accumulator 2 on the connecting lever 6, 6a becomes effective, while in pulling of the trailer, the sum of these forces comes into operation.

The arrangement is preferably such that for damping jolts due to running up a smaller auxiliary power is available than for applying the trailer brakes. This can be accomplished either by suitable choice of the length and position of the effective lever arms of the levers 3 and 6a, or by making the strength of the power accumulator 8 somewhat smaller than that of the braking power accumulator 2.

When the coupling between the tractor and trailer is accidentally released or when the trailer is to be braked independently of the tractor, the locking lever 23, 23a is lifted by pulling the line 24 to release the pin 22 of the connecting rod 7. The brake power accumulator 2 can then be released independently of the state of tension of the damping or release power accumulator 8 and apply the brakes. The levers 3, 6, 6a are moved anticlockwise and the connecting rod 7 is withdrawn from the sheath 19, the pin 22 gliding in the slot 21. By swinging the hand lever 12 in opposite direction the brakes can be released again while the brake power accumulator 2 is loaded, the locking pawl 23, responding to the pull of the spring 25, moving again behind the pin 22 and establishing a firm connection between the connecting rod 7 and the coupling rod 11.

By drawing the hand lever 12 to the left a greater or smaller braking effect can be attained at some expenditure of force independently of running-up pressure until the moment of the brake power accumulator 2 preponderates relative to that of the release power accumulator 8 and the release position can be attained again only by forcefully repressing the hand lever 12 or by a corresponding strong pull on the traction eye 11a.

In the construction according to Fig. 2 the brake power accumulator 62 and the release power accumulator 68, the tractive force of which is utilized, are connected with one another by a scale beam 14 which effects uniform initial tension of the two power accumulators of equal strength. The other parts provided with the same reference numerals correspond to those in Fig. 1. The scale beam 14 and the elbow lever 26 corresponding to the levers 3, 6, 6a in Fig. 1, which may be integral with the hand lever 12, are articulated to the two ends of a support 27 arranged on a cross tube 29 secured to the towing pole 1 by means of the straps 28. The elbow lever 26 causing during rotation opposite variation in the length of the spring lever arms may be subdivided and provided with an adjustable stop 5 in the same manner as the levers, 3, 6, 6a in Fig. 1. The action of the brake power accumulator 62 and of the release power accumulator 68 in conjunction with the lever 26 is similar to that in Fig. 1. The lever 26 is shown in middle position at which the power accumulator system maintains balance of moments.

In order to attain a braking effect independently of the running-up pressure and without much effort the connecting rod 7 is displaceably disposed in the tubular portion 30 of the draw or pressing rod 11. A cylindrical helical spring 31 inside the portion 30 is initially tensioned and presses against the intermediate rod 7 held by the pawl 23, 23a onto the cross pin 22. The spring 31 serves as additional brake power accumulator which, when the line 24 is pulled, presses the rods 11, 30, 7 apart, moves the lever 26 and then the braking levers 32 (one of which is shown in Fig. 3) by means of the rod 13 and applies the brakes arranged in the drums 33 of the wheels 34. Release of the brakes and reloading of the additional brake power accumulator 31 can be effected by pushing back the tractor or manually by means of the lever 12 in the manner described by way of an auxiliary power freed in the brake power accumulator 67 and of the power corresponding to the tension of the spring 31, or, at much less effort, by completely lowering and lifting the towing shaft 1 if a tractor is not available. In the latter instance, however, the trailer must be provided with a stop 35 for the lever 26 when the pole 1 is swung down about the shaft 36, so that the connecting rod 7 is pushed again into the tubular portion 30 of the rod 11 until the pawl 23 engages behind the cross pin 22. Simultaneously, the lever 26 and the power accumulators 62 and 68 are moved into release position. 56 is a shock absorbing spring mounted on the drawrod 11, which is pressed by the connection 59 on the rod 11 against the guide bearing 17, when strong pulling forces are exerted upon the traction eye 11a, so that these forces are transmitted directly to the towing pole 1 and the trailer.

In the constructions according to Figs. 1 and 2 the brake power accumulator can be tensioned by the hand lever 12 only at great effort and relatively great length of this lever after release of the pawl 23, and the demand to provide for automatic braking by lowering of the towing pole 1 is at variance with the further requirement that the brake sought to act equally well if the trailer is coupled with tractors having a lower or greater coupling height. The construction according to Figs. 3 to 6 eliminates these difficulties and does not need a special stop 35 for reloading the additional brake power accumulator 31.

In the construction according to Figs. 3 to 6, wherein similar reference numerals correspond to similar parts in Figs. 1 and 2, the connecting rod 7 is articulated at 37 to a double-armed intermediate lever 38, 38a. With this intermediate lever 38, 38a the brake power and release power device, each comprising two pairs of springs 52 and 58 and being automatically locked in end positions, is connected. The pairs of springs 52 and 58 of equal strength are arranged on the ball crank 39 which while generally corresponding to the scale beam 14 in Fig. 2 effects, however, a variation of the spring lever arms upon motion of the intermediate lever 38, 38a. To the rod 7 an intermediate rod 41 is also articulated at 40, which transmits the motion to the lever 42 corresponding to the lever 6, 6a in Fig. 1 and is rotatable about a shaft 43 secured to the trailer. By means of the adjustable stop 5 the lever 42 exerts pressure on the lever 44, also rotatable about the shaft 43, to which at 45 the adjustable rod 13 is joined which leads to the brake levers 32. In the longitudinal slot 46 in the left hand portion of the lever 44 a rod 48 articulated at 47 to the lever member 38a is displaceably disposed. The pairs of springs 52 and 58 possess considerable initial tension.

The action of this brake is as follows:

When the trailer runs up towards the tractor, the rod 7 is displaced to the right and the brakes are applied by way of the levers and rods 41, 42, 44, 13 according to the running-up pressure. Simultaneously, the lever 38, 38a, is moved which in Fig. 3 is exactly in middle position at which the bell crank 39, owing to the equal initial tension of the two pairs of springs 52 and 58 is at an unstable position of equilibrium. When the lever 38, 38a is moved a little more, the spring lever arm of the brake power accumulator 58 preponderates and the lever 39 tilts into the braking position indicated in Fig. 5 until its projection 49 abuts against the carrier 27. Simultaneously, the pairs of springs 52 and 58 tend to equalize their tension relative to one another and thus, independently of running-up pressure, pull the lever 38, 38a into braking position by means of the auxiliary power released.

The brakes remain applied until a pull is exerted by the tractor on the rod 11, which overcomes this auxiliary power, so that by moving the lever 38, 38a into the release position shown in Fig. 6 the bell crank 39 is drawn by the release power accumulator 52 into the other end position at which the stop 49a abuts against the carrier 27. The auxiliary power now being released at the equalization of tension of the springs 52 and 58 keeps the brakes off until the trailer runs up again. Through the auxiliary power accumulator device the lever 38, 38a is therefore automatically locked in both end positions.

From braking position, attainable also by the release of the additional brake power accumulator 31 by a pull on the cord 24, the device can be brought into release position also by lowering and lifting again the towing pole 1 while simultaneously the brake power accumulator 31 is loaded again in the following manner:

The point 47 where the connecting rod 48 joins the lever member 38a is positioned near the pivot 50 for the poles 1, so that during up and down motion of the latter no appreciable motion of the rod 48 and of the intermediate lever 44 occurs. The other connecting rod 41 is, however, articulated to the intermediate lever 38 or the rear end of the tubular rod 7 considerably underneath the pivot 50 and during lowering of the poles 1 tends therefore to move still farther back. Since the brakes are fully applied already, further motion of the parts 7, 41, 42, 44, 13, 32 in braking direction cannot take place, in consequence whereof, during the lowering of the poles 1, the rod 7 is pushed into the tubular portion 30 of the rod 11 and the spring 31 is tensioned again until the pawl 23 catches behind the pin 22. Simultaneously, the intermediate lever 38, 38a with the auxiliary power accumulating device 52, 58, 39 is brought into the self-locking release position shown in Fig. 6 while the brakes remain applied and only the connecting rod 48 is displaced to the right in the slot 46, the braking pressure gradually decreasing to zero only when the towing poles are lifted. The rigging, particularly the stop 5, is preferably so adjusted that the brakes are released, when the coupling eye 11a is lifted on a level with the lowest tractor coupling. In case of couplings located at a higher level play will of course occur between the stop 5 and the lever 44, but the running-up pressure will still be transmitted to the brakes without the least variation owing to the provision of the intermediate rod 48 which is not subjected to the variations in the position of the pole 1.

The additional brake power accumulator 31 may in the tensioned position shown still be somewhat compressible so as to reduce the force of very great shocks due to running up, whereby the brakes are caused to make complete contact and in case of a non-yielding connection between the traction eye 11a and the brake levers 32 the braking device might be damaged.

The subject matter of the invention is not departed from if the braking device is arranged on the vehicle frame in other than the manner illustrated. It is further immaterial what means are applied as power accumulators, which can also be constructed as compressed air accumulators, etc., instead of as springs. Besides compressed air, rubber or another elastic material for instance and, generally, any inherently elastic means may serve as power accumulator.

We claim:

1. Automatic brake for trailer vehicles, comprising a draw rod longitudinally displaceable on the pole of the trailer, a brake rod connected with the brake levers of the wheels, a lever mechanism interposed between said rods, elastic means engaging said lever mechanism with initial tension and tending to hold said lever mechanism in either braking position or brake releasing position, and means for varying the angular position of the levers of the lever mechanism relative to one another.

2. Automatic brake for trailer vehicles, comprising a draw rod longitudinally displaceable on the pole of the trailer, a traction eye on said draw bar, a brake rod connected with the brake levers of the wheels, a lever mechanism interposed between said rods, elastic means engaging said lever mechanism with initial tension and tending to hold said lever mechanism in either braking position or brake releasing position, a scale beam for compensating the tension of said elastic means, and manually controllable releasing means for automatically varying the length of the rod means positioned between the traction eye and the brake levers.

3. Automatic brake for trailer vehicles, comprising a draw rod longitudinally displaceable on the pole of the trailer, a brake rod connected with the brake levers of the wheels, a traction eye on said draw bar, a brake power accumulator and a power accumulator for releasing the brakes, said power accumulators being connected with one another by levers having variable leverage and acting on said rods, and manually controllable releasing means for automatically varying the length of the rod means positioned between the traction eye and the brake levers.

4. Automatic brake for trailer vehicles, comprising a draw rod longitudinally displaceable on the pole of the trailer, a traction eye on said draw bar, a brake rod connected with the brake levers of the wheels, a brake power accumulator and a power accumulator for releasing the brakes, said power accumulators acting on said rods through connecting members with variable power transmission, an additional initially loaded power accumulator, and means for manually releasing said additional initially loaded power accumulator and producing a variation in the length of the rod means positioned between the traction eye and the brake levers.

5. Automatic brake for trailer vehicles, comprising a draw rod longitudinally displaceable on the pole of the trailer, a brake rod connected with the brake levers of the wheels, a brake power accumulator and a power accumulator for releasing the brakes, said power accumulators acting on said rods through connecting members with variable power transmission, an additional initially loaded power accumulator, two telescopic rods engaged by said additional power accumulator, and a manually releasable pawl for holding the telescopic rods in telescoped position.

6. Automatic brake for trailer vehicles, comprising a draw rod displaceable on the pole of the trailer, a brake rod connected with the brake levers of the wheels, a brake power accumulator and a power accumulator for releasing the brakes, said power accumulators acting on said rods through connecting members with variable power transmission, manually controllable releasing means for releasing an additional initially loaded brake power accumulator, and a hand lever for moving the connecting lever united with said brake power accumulator to apply and release the brakes and to re-load said additional brake power accumulator.

7. Automatic brake for trailer vehicles, comprising a draw rod longitudinally displaceable on the pole of the trailer, a brake rod connected with the brake levers of the wheels, a lever mechanism interposed between said rods, elastic means engaging said lever mechanism with initial tension and tending to hold said lever mechanism in either braking position or brake releasing position, an additional initially loaded brake power accumulator, and means for releasing said brake power accumulator and re-loading said additional brake power accumulator by lowering and raising the towing pole of the trailer.

8. Automatic brake for trailer vehicles, comprising a draw rod longitudinally displaceable on the pole of the trailer, a brake rod connected with the brake levers of the wheels, two double-armed connecting levers for transmitting motion from said draw rod to said brake rod, and initially tensioned elastic means which engage one of said double-armed connecting levers between said rods and hold it in either braking position or brake releasing position.

9. Automatic brake for trailer vehicles, comprising a draw rod longitudinally displaceable on the pole of the trailer, a brake rod connected with the brake levers of the wheels, two double-armed connecting levers for transmitting motion from said draw rod to said brake rod, initially loaded elastic means engaging one of said double-armed levers between said rods and holding it in either braking position or brake releasing position, and a movable bell crank between which and said one of said double-armed connecting levers said elastic means are provided.

10. Automatic brake for trailer vehicles, comprising a towing pole pivoted on the trailer vehicle to swing upon a horizontal axis, a draw rod longitudinally displaceable on said pole, a brake rod connected with the brake levers of the wheels, two double-armed connecting levers for transmitting motion from said draw rod to said brake rod, initially tensioned elastic means engaging one of said double-armed connecting levers between said rods and holding it in either braking position or brake releasing position, a movable bell crank between which and the said one of said double-armed connecting levers said elastic means are provided, and a connecting member articulated near said axis of the pole to said one connecting lever and leading to the brake rod, wherein it is displaceable in a longitudinal slot.

11. Automatic brake for trailer vehicles, comprising a towing pole pivoted on the trailer vehicle to swing upon a horizontal axis, a draw rod longitudinally displaceable on said pole, a brake rod connected with the brake levers of the wheels, two double-armed connecting levers for transmitting motion from said draw rod to said brake rod, initially tensioned elastic means engaging one of said double-armed connecting levers and holding it in either braking position or brake releasing position, and a connecting member articulated near said axis of the pole to the said one of said double-armed connecting levers and leading to the brake rod, wherein it is displaceable in a longitudinal slot, the other one of said connecting levers being articulated at its fulcrum to cause transmission of motion in one direction only.

12. Automatic brake for trailer vehicles, comprising a towing pole pivoted on the trailer vehicle to swing upon a horizontal axis a draw rod longitudinally displaceable on said pole, a brake rod connected with the brake levers of the wheels, two double-armed connecting levers for transmitting motion from said draw rod to said brake rod, initially tensioned elastic means engaging one of said double-armed connecting levers and holding it in either braking position or brake releasing position and a connecting member articulated near said axis of the pole to the said one of said double-armed connecting levers and leading to said brake rod, wherein it is displaceable in a longitudinal slot, the other one of said two-armed connecting levers being articulated at the fulcrum thereof in such manner that transmission of motion occurs in one direction only.

13. Automatic brake for trailer vehicles, comprising a towing pole pivoted on the trailer vehicle to swing upon a horizontal axis, a draw rod longitudinally displaceable on said pole, a traction eye on said draw bar, a brake rod connected with the brake levers of the wheels, two double-armed connecting levers for transmitting motion from said draw rod to said brake rod, initially tensioned elastic means engaging one of said double-armed connecting levers and holding it in either braking position or brake releasing position, a connecting member articulated near said axis of the pole to the said one of said double-armed connecting levers and leading to said brake rod, wherein it is displaceable in a longitudinal slot, the other one of said two-armed connecting levers being articulated at the fulcrum thereof in such manner that transmission of motion occurs in one direction only, and a connecting rod arranged between said two double-armed connecting levers and articulated below said axis of the pole to the first one of said double-armed connecting levers in such manner that during lowering of said pole said double-armed connecting levers are moved and the brakes applied.

14. Automatic brake for trailer vehicles, comprising a towing pole pivoted on the trailer vehicle to swing upon a horizontal axis, a draw rod longitudinally displaceable on said pole means on the said drawrod for connection to the towing vehicle and for taking up and transmitting the towing forces and the running up pressure to the trailer vehicle and its braking mechanism, a brake rod connected with the brake levers of the wheels, two double-armed connecting levers for transmitting motion from said draw rod to said brake rod, initially tensioned elastic means engaging one of said double-armed connecting levers and holding it in either braking position or brake releasing position, a connecting member articulated near said axis of the pole to the said one of said double-armed connecting levers and leading to said brake rod, wherein it is displaceable in a longitudinal slot, the other one of said two-armed connecting levers being articulated at the fulcrum thereof in such manner that transmission of motion occurs in one direction only, a connecting rod arranged between said two double-armed connecting levers and articulated below said pivot of the pole to the first one of said double-armed connecting levers in such manner that during lowering of said pole said double-armed connecting levers are moved and the brakes applied, and means for causing a variation in the length of the brake rigging positioned between the said drawrod and the brake levers independently of the said running-up pressure.

15. The combination with a trailer vehicle comprising wheels, brakes therefor, and a towing pole; of brake actuating means comprising a draw rod slidable with respect to said pole and provided with means for attachment to the towing vehicle, a rod connected to said brakes, a braking power accumulator, a brake releasing power accumulator, and means interconnecting said rods and said power accumulators in such a way that said power accumulators act against each other with variable moments, so that in the braking position of the system comprising said rods and said interconnecting means, the braking power accumulator predominates and in the brake releasing position of said system the brake releasing power accumulator predominates, and manually releasable means for changing the length of said system.

16. The combination with a trailer vehicle comprising wheels, brakes therefor, and a towing pole; of brake actuating means comprising a draw rod slidable with respect to said pole and provided with means for attachment to the towing vehicle, a rod connected to said brakes, and means interconnecting said rods comprising a pivoted member and power accumulating means acting upon said member so that in passing from braking position to brake releasing position it passes through a state of unstable equilibrium, and manually releasable means for changing the length of the system, comprising said rods and said interconnecting means.

17. The combination with a trailer vehicle comprising wheels, brakes therefor, and a towing pole; of brake actuating means comprising a draw rod slidable with respect to said pole and provided with means for attachment to the towing vehicle, a rod connected to said brakes, lever means interconnecting said rods, power accumulators acting in opposition upon the system comprising said rods and lever means with variable force transmission in such a way that in the position of the system in which the brake is applied one power accumulator predominates over the other to hold the system in said position, while in the position of the system in which the brake is released the other power accumulator predominates over said first power accumulator to hold the system in said releasing position, and manually releasable means for changing the length of said system.

KURT SCHRÖTER.
HANS SCHRÖTER.